United States Patent
Ito et al.

(10) Patent No.: US 12,011,742 B2
(45) Date of Patent: Jun. 18, 2024

(54) OPTICAL SORTER

(71) Applicant: SATAKE CORPORATION, Tokyo (JP)

(72) Inventors: Takafumi Ito, Tokyo (JP); Tomoyuki Miyamoto, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 0 days.

(21) Appl. No.: 18/034,088

(22) PCT Filed: Nov. 9, 2021

(86) PCT No.: PCT/JP2021/041239
§ 371 (c)(1),
(2) Date: Apr. 27, 2023

(87) PCT Pub. No.: WO2022/102631
PCT Pub. Date: May 19, 2022

(65) Prior Publication Data
US 2023/0398578 A1    Dec. 14, 2023

(30) Foreign Application Priority Data
Nov. 10, 2020  (JP) ................. 2020-187213

(51) Int. Cl.
B07C 5/342      (2006.01)
B07C 5/36       (2006.01)
F16K 31/00      (2006.01)

(52) U.S. Cl.
CPC ............ B07C 5/3425 (2013.01); B07C 5/366 (2013.01); F16K 31/008 (2013.01)

(58) Field of Classification Search
CPC ......... B07C 5/3425; B07C 5/36; B07C 5/363; B07C 5/365; B07C 5/366; B07B 4/02;
(Continued)

(56) References Cited

U.S. PATENT DOCUMENTS 9,097,359 B2 *   8/2015   Ito ................. F16K 31/02
10,738,905 B2 *  8/2020   Ito ................. B07B 11/04
2019/0093784 A1  3/2019   Ito et al.

FOREIGN PATENT DOCUMENTS

EP   2808096 A1    12/2014
JP   H06-41876 U   6/1994
(Continued)

*Primary Examiner* — Michael McCullough
*Assistant Examiner* — Jessica L Burkman
(74) *Attorney, Agent, or Firm* — Faegre Drinker Biddle & Reath LLP

(57) ABSTRACT

In an optical sorter that includes an optical detection unit to detect a to-be-sorted material at a detection position, a determining unit to determine a to-be-sorted material to be removed, based on a detection result by the optical detection unit, and an air-jetting unit to blow off and remove the to-be-sorted material to be removed using jet air of a compressed gas, based on a determination result by the determining unit, the air-jetting unit includes a piezoelectric valve to perform valve opening and closing by driving a valve disc utilizing displacement of a piezoelectric element, and a valve driving unit to apply a drive voltage to the piezoelectric element, and the valve driving unit controls the drive voltage applied to the piezoelectric element in accordance with the to-be-sorted material to be removed to thus control a jet-air pressure of the compressed gas for removing the to-be-sorted material.

6 Claims, 4 Drawing Sheets

(58) Field of Classification Search
CPC .... F16K 31/004; F16K 31/005; F16K 31/006; F16K 31/007; F16K 31/008
USPC ........................................................ 209/576
See application file for complete search history.

(56) References Cited

FOREIGN PATENT DOCUMENTS

| | | |
|---|---|---|
| JP | H11-179292 A | 7/1999 |
| JP | 2012-143670 A | 8/2012 |
| JP | 2014-233644 A | 12/2014 |
| JP | 2017-160973 A | 9/2017 |

* cited by examiner

FIG. 4A
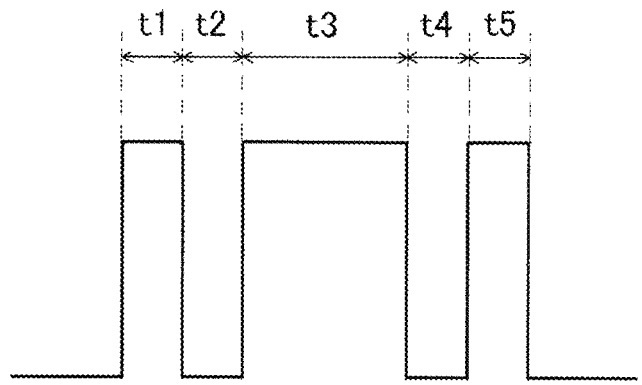
FIG. 4B
| DRIVE VOLTAGE [V] | INPUT SIGNAL [ms] | | | | |
|---|---|---|---|---|---|
| | t1 | t2 | t3 | t4 | t5 |
| 72 | 0.098 | 0.080 | 0.6 | 0.030 | 0.192 |
| 66 | 0.108 | 0.073 | 0.6 | 0.025 | 0.194 |
| 60 | 0.120 | 0.066 | 0.6 | 0.010 | 0.204 |
| 54 | 0.135 | 0.056 | 0.6 | 0.005 | 0.204 |
| 48 | 0.155 | 0.044 | 0.6 | 0.010 | 0.191 |
FIG. 5
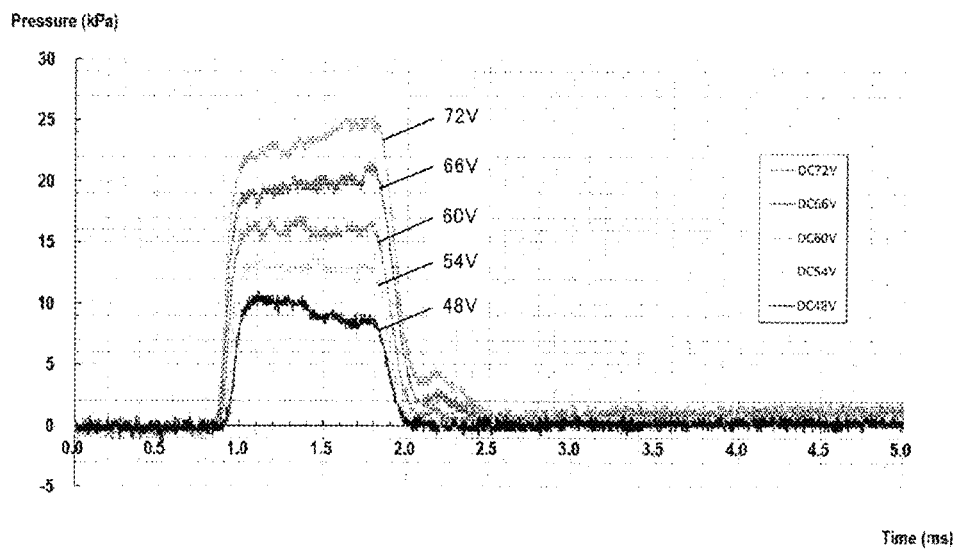

|  | DAMAGED GRAINS | RICE HULLS | FOREIGN MATTER |
| --- | --- | --- | --- |
| DRIVE VOLTAGE | 72 V | 54 V | 54 V OR LOWER |
| DISCHARGE PORT | C | B | A |

OPTICAL SORTER

CROSS REFERENCE TO PRIOR APPLICATIONS

This application is the National Stage of International Application No. PCT/JP2021/041239 filed Nov. 9, 2021 and claims benefit of Japanese Application No. 2020-187213 filed Nov. 10, 2020, which are herein incorporated by reference in their entirety.

TECHNICAL FIELD

The present invention relates to an optical sorter that sorts particulates such as grains or resin pellets and the like by blowing them off using jet air.

BACKGROUND ART

Conventionally, an optical sorter is known which sorts particulates such as grains or resin pellets into non-defectives and defectives by blowing them off using jet air or removes, using jet air, foreign matter and the like mixed into particulates (see Patent Literatures 1 and 2).

The optical sorters described in Patent Literatures 1 and 2 detect defectives of particulates, foreign matter, and the like that are falling along a predetermined trajectory from an end of a transport path, and blow off and remove the detected defectives, foreign matter, and the like using jet air, based on an air-jetting time set in accordance with the falling velocity or the size, so that the particulates are sorted.

Now, these optical sorters use a solenoid valve and surely remove defectives, foreign matter, and the like by setting the air-jetting time longer, but removal of non-defectives together, which is so-called "involvement", becomes more frequent, which could lower the yield of products in some cases.

CITATION LIST

Patent Literature

[Patent Literature 1]
Japanese Patent Laid-Open No. 1999-179292
[Patent Literature 2]
Japanese Utility Model Laid-Open No. 6-41876

SUMMARY OF INVENTION

Technical Problem

Thus, an object of the present invention is to provide an optical sorter capable of reducing the involvement and surely removing a to-be-sorted material to be removed.

Solution to Problem

To achieve the aforementioned object, an embodiment of the present invention is an optical sorter that includes an optical detection unit adapted to detect a to-be-sorted material at a detection position, a determining unit adapted to determine a to-be-sorted material to be removed, based on a detection result by the optical detection unit, and an air-jetting unit adapted to blow off and remove the to-be-sorted material to be removed using jet air of a compressed gas, based on a determination result by the determining unit, in which the air-jetting unit includes a piezoelectric valve adapted to perform valve opening and closing by driving a valve disc utilizing displacement of a piezoelectric element, and a valve driving unit adapted to apply a drive voltage to the piezoelectric element, and the valve driving unit controls the drive voltage applied to the piezoelectric element in accordance with the to-be-sorted material to be removed to thus control a jet-air pressure of the compressed gas for removing the to-be-sorted material.

Further, an embodiment of the present invention is an optical sorter that includes a transfer unit adapted to transfer a to-be-sorted material, an optical detection unit adapted to detect, at a detection position, the to-be-sorted material falling from an end of the transfer unit, a determining unit adapted to determine a to-be-sorted material to be removed, based on a detection result by the optical detection unit, and an air-jetting unit provided further below the optical detection unit and adapted to blow off and remove the to-be-sorted material to be removed using jet air of a compressed gas, based on a determination result by the determining unit, in which the air-jetting unit includes a piezoelectric valve adapted to perform valve opening and closing by driving a valve disc utilizing displacement of a piezoelectric element, and a valve driving unit adapted to apply a drive voltage to the piezoelectric element, and the valve driving unit controls the drive voltage applied to the piezoelectric element in accordance with the to-be-sorted material to be removed to thus control a jet-air pressure of the compressed gas for removing the to-be-sorted material.

Further, it is preferable that the valve driving unit should control the drive voltage applied to the piezoelectric element in accordance with the to-be-sorted material to be removed to thus control the jet-air pressure of the compressed gas for removing the to-be-sorted material, by driving the valve disc using expansion and contraction of the piezoelectric element.

Furthermore, it is preferable that the valve driving unit should set in advance the voltage value of the drive voltage applied to the piezoelectric element in accordance with the to-be-sorted material to be removed.

In addition, it is preferable that the valve driving unit should control the drive voltage applied to the piezoelectric element in accordance with the to-be-sorted material to be removed to thus control the jet-air pressure of the compressed gas for removing the to-be-sorted material so as to change a distance of blowing off using the jet air in accordance with the to-be-sorted material, so that the to-be-sorted material to be removed should be divided into a plurality of groups in accordance with a difference in the distance of blowing off using the jet air.

Further, it is preferable that the determining unit should determine a type of the to-be-sorted material to be removed, and the valve driving unit should control the drive voltage applied to the piezoelectric element in accordance with the type of the to-be-sorted material to be removed to thus control the jet-air pressure of the compressed gas for removing the to-be-sorted material.

Furthermore, it is preferable that the determining unit should determine a size of the to-be-sorted material to be removed, and the valve driving unit should control the drive voltage applied to the piezoelectric element in accordance with the size of the to-be-sorted material to be removed to thus control the jet-air pressure of the compressed gas for removing the to-be-sorted material.

In addition, it is preferable that the determining unit should determine a type and a size of the to-be-sorted material to be removed, and the valve driving unit should control the drive voltage applied to the piezoelectric element in accordance with the type and the size of the to-be-sorted material to be removed to thus control the jet-air pressure of the compressed gas for removing the to-be-sorted material.

Further, it is preferable that the piezoelectric valve should include a valve main body including a gas pressure chamber adapted to receive a compressed gas supplied from an outside, and a gas exhaust path adapted to exhaust the compressed gas from the gas pressure chamber, and an actuator including the valve disc disposed in the gas pressure chamber and adapted to open and close the gas exhaust path, the piezoelectric element adapted to generate a drive force necessary for operating the valve disc as displacement, and a displacement mechanism adapted to cause the displacement of the piezoelectric element to be acted on the valve disc, and the valve driving unit controls the drive voltage applied to the piezoelectric element in accordance with the to-be-sorted material to be removed to thus control the jet-air pressure of the compressed gas for removing the to-be-sorted material, by driving the valve disc using expansion and contraction of the piezoelectric element.

Advantageous Effects of Invention

In the optical sorter of the embodiment of the present invention, the air-jetting unit includes the piezoelectric valve adapted to perform valve opening and closing by driving the valve disc utilizing displacement of the piezoelectric element and the valve driving unit adapted to apply the drive voltage to the piezoelectric element, and the valve driving unit controls the drive voltage applied to the piezoelectric element in accordance with the to-be-sorted material to be removed to thus control the jet-air pressure of the compressed gas for removing the to-be-sorted material, and thus, with the piezoelectric valve provided that is superior to a solenoid valve in responsiveness during valve opening and closing, the air-jetting time need not be set longer unlike the conventional optical sorters using the solenoid valve, and the valve driving unit controls the drive voltage applied to the piezoelectric element of the piezoelectric valve, so that the jet-air pressure of the compressed gas can be changed, even when the compressed gas supply pressure is constant.

Therefore, according to the optical sorter of the embodiment of the present invention, since the air-jetting time can be fixed at a short period of time in which for example, the surrounding to-be-sorted material does not get involved and the jet-air pressure of the compressed gas can be controlled in accordance with the to-be-sorted material to be removed, the involvement of the other to-be-sorted material is reduced to thus be able to surely remove the to-be-sorted material to be removed.

In the optical sorter of the embodiment of the present invention, since the valve driving unit controls the drive voltage applied to the piezoelectric element in accordance with the to-be-sorted material to be removed to thus control the jet-air pressure of the compressed gas for removing the to-be-sorted material, by driving the valve disc using expansion and contraction of the piezoelectric element, the jet-air pressure of the compressed gas can be changed, even when the compressed gas supply pressure is constant.

In the optical sorter of the embodiment of the present invention, when the valve driving unit controls the drive voltage applied to the piezoelectric element in accordance with the to-be-sorted material to be removed to thus control the jet-air pressure of the compressed gas for removing the to-be-sorted material so as to change the distance of blowing off using the jet air in accordance with the to-be-sorted material, the involvement of the other to-be-sorted material is reduced to thus be able to surely remove the to-be-sorted material to be removed and also, the to-be-sorted material to be removed can be divided into a plurality of groups in accordance with a difference in the distance of blowing off using the jet air.

In the optical sorter of the embodiment of the present invention, when the determining unit determines the type of the to-be-sorted material to be removed and the valve driving unit controls the drive voltage applied to the piezoelectric element in accordance with the type of the to-be-sorted material to be removed to thus control the jet-air pressure of the compressed gas for removing the to-be-sorted material, the to-be-sorted material to be removed can be properly removed in accordance with the type.

In the optical sorter of the embodiment of the present invention, when the determining unit determines the size of the to-be-sorted material to be removed and the valve driving unit controls the drive voltage applied to the piezoelectric element in accordance with the size of the to-be-sorted material to be removed to thus control the jet-air pressure of the compressed gas for removing the to-be-sorted material, the to-be-sorted material to be removed can be properly removed in accordance with the size.

In the optical sorter of the embodiment of the present invention, when the determining unit determines the type and the size of the to-be-sorted material to be removed and the valve driving unit controls the drive voltage applied to the piezoelectric element in accordance with the type and the size of the to-be-sorted material to be removed to thus control the jet-air pressure of the compressed gas for removing the to-be-sorted material, the to-be-sorted material to be removed can be properly removed in accordance with a combination of the type and the size.

In the optical sorter of the embodiment of the present invention, when the piezoelectric valve includes the valve main body including the gas pressure chamber adapted to receive the compressed gas supplied from the outside, and the gas exhaust path adapted to exhaust the compressed gas from the gas pressure chamber, and the actuator including the valve disc disposed in the gas pressure chamber and adapted to open and close the gas exhaust path, the piezoelectric element adapted to generate a drive force necessary for operating the valve disc as displacement, and the displacement mechanism adapted to cause the displacement of the piezoelectric element to be acted on the valve disc, and the valve driving unit controls the drive voltage applied to the piezoelectric element in accordance with the to-be-sorted material to be removed to thus control the jet-air pressure of the compressed gas for removing the to-be-sorted material, by driving the valve disc using expansion and contraction of the piezoelectric element, since the piezoelectric valve is excellent in responsiveness during valve opening and closing, the air-jetting time of the compressed gas can be reduced as compared to the conventional optical sorters using the solenoid valve, and the involvement of the other to-be-sorted material is reduced to thus be able to surely blow off the to-be-sorted material to be removed.

BRIEF DESCRIPTION OF DRAWINGS

FIG. 4A is an explanatory diagram of a drive voltage applied to a piezoelectric element.

FIG. 4B is a table for describing the drive voltage applied to the piezoelectric element.

FIG. 5 is a graph for describing air ejection pressure characteristics of the piezoelectric valve.

DESCRIPTION OF EMBODIMENTS

Embodiments of the present invention will be described with reference to the drawings.

Embodiment 1

An optical sorter of Embodiment 1 of the present invention sorts particulates as raw material into two types, such as non-defectives and defectives or raw material and foreign matter.

Figure 1:
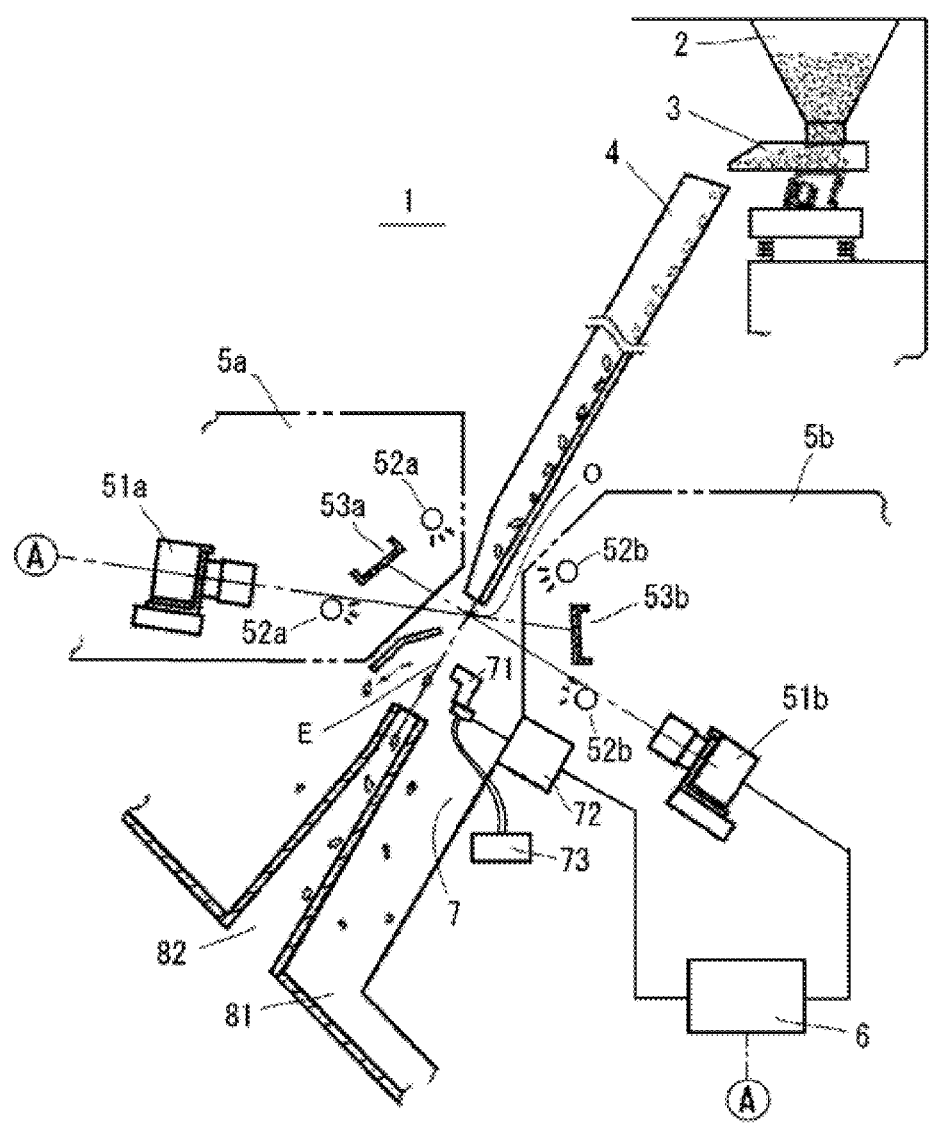
FIG. 1 is an explanatory view of an optical sorter of Embodiment 1, which is a cross-sectional side view of a main part.
Figure 2:
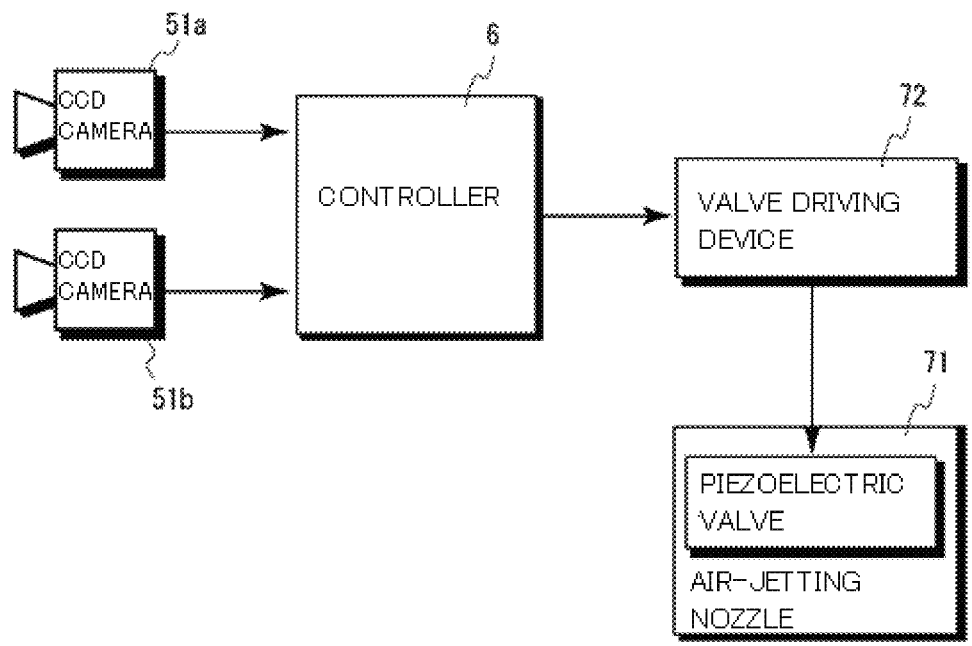
FIG. 2 is a control block diagram of the optical sorter.

FIG. 1 is a cross-sectional side view of a main part of the optical sorter of Embodiment 1 of the present invention, showing the internal structure with a simplified illustration. FIG. 2 is a control block diagram of the optical sorter.

An optical sorter 1 of Embodiment 1 of the present invention includes, on the upper portion, a particulates supplying part including a tank 2 and a vibrating feeder 3. An inclined chute 4 having a predetermined width is disposed below the particulates supplying part.

The particulates supplied from the particulates supplying part continuously, naturally flow down spreading widthwise on the inclined chute 4 and are then discharged to the air from the lower end of the inclined chute 4 along a predetermined fall trajectory.

In front of and behind the predetermined fall trajectory, at least a pair of optical detectors 5a and 5b are disposed facing each other, which image particulates in a particulates detection position O extending linearly in parallel to the width direction of the inclined chute 4. The optical detectors 5a and 5b include imaging units 51a and 51b such as a CCD camera, each including a built-in line sensor or area sensor such as a CCD and allowing reception of light in the wavelength range of near infrared rays (NIR), visible rays or ultraviolet rays, and the like, illuminating units 52a and 52b including an LED or the like, backgrounds 53a and 53b serving as backgrounds in imaging the particulates, and the like.

Further, an air-jetting device 7 adapted to remove defectives, foreign matter, and the like (hereinafter referred to as "defectives and the like") using jet air is disposed below the particulates detection position O. The air-jetting device 7 includes an air-jetting nozzle 71 composed of a plurality of piezoelectric valves, which will be described later, arranged side-by-side and incorporated, a valve driving device 72 adapted to drive the piezoelectric valves to open and close, and a compressed air supplier 73 adapted to send compressed air to the air-jetting nozzle 71. Based on the detection results by the optical detectors 5a and 5b, the piezoelectric valves are selectively driven to open, and particulates to be discharged from a lower end of the inclined chute 4 are blown off using the jet air from a plurality of nozzle holes of the air-jetting nozzle 71 provided corresponding to the respective positions in the width direction of the fall trajectory of the particulates. It should be noted that the piezoelectric element of the piezoelectric valve is electrically connected to a drive circuit of the valve driving device 72.

In the aforementioned optical sorter 1, the particulates continuously, naturally flowing down spreading widthwise on the inclined chute 4 and then discharged to the air from the lower end of the inclined chute 4 along the predetermined fall trajectory are imaged in the particulates detection position O by the imaging units 51a and 51b of the optical detectors 5a and 5b, and image data is transmitted to a controller 6.

The controller 6 includes a determination part that acquires information and the like on the color, shape, and the like of the particulates based on the image data to determine the type, the size, and the like of the particulates so as to identify the particulates to be removed, such as defectives, and transmits an exclusion signal of the defectives and the like to the valve driving device 72 based on the determination results by the determination part.

The air-jetting device 7 selectively drives the plurality of piezoelectric valves at predetermined timing based on the exclusion signal transmitted to the valve driving device 72. Then, air is jetted from the nozzle holes of the air-jetting nozzle 71 provided corresponding to the positions in the width direction of the inclined chute 4 toward the defectives and the like that are passing a particulates excluding position E extending linearly in parallel to the width direction.

Then, the defectives and the like blown off by the jet air from the nozzle holes of the air-jetting nozzle 71 are discharged to the outside through a defectives discharge port 81. Further, the non-defectives and the like passing the predetermined fall trajectory without being blown off by the jet air are collected through a non-defectives discharge port 82.

Next, the piezoelectric valve will be described.

Figure 3:
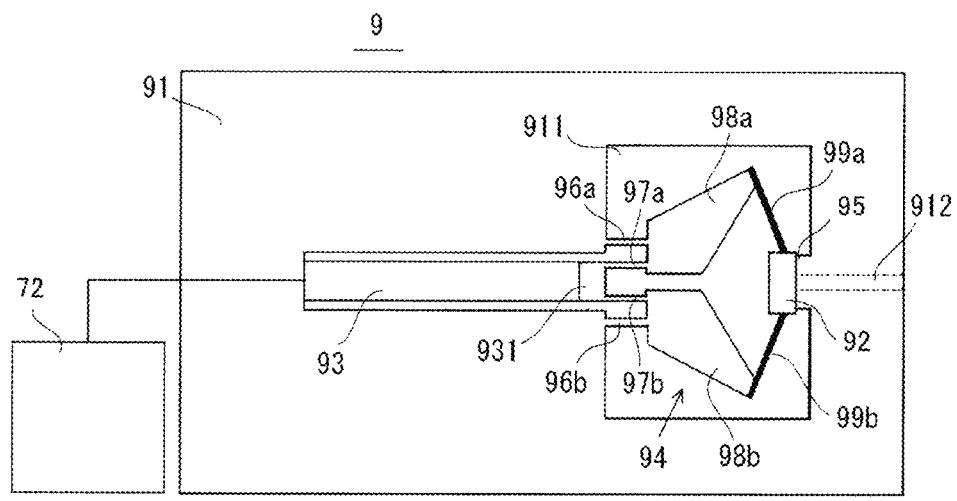
FIG. 3 is a schematic explanatory view of a piezoelectric valve.

FIG. 3 is a schematic explanatory view of the piezoelectric valve with a side face of the valve main body opened, which is a side view of the valve when closed.

In the embodiment of the present invention, the piezoelectric valve refers to those performing valve opening and closing by utilizing the displacement of the piezoelectric element to drive the valve disc.

A piezoelectric valve 9 shown in FIG. 3 includes a valve main body 91, an actuator including a valve disc 92, a piezoelectric element 93, and a displacement magnifying mechanism 94, and the valve driving device 72.

The valve main body 91 includes a gas pressure chamber 911 that is supplied with a compressed gas from an external compressed gas supply source (not shown) and a gas exhaust path 912 that ejects the gas inside the gas pressure chamber 911 to the outside.

The valve disc 92 is disposed inside the gas pressure chamber 911 of the valve main body 91 and opens and closes the gas exhaust path 912.

The piezoelectric element 93 is disposed inside the valve main body 91, with one end fixed to the valve main body 91.

The displacement magnifying mechanism 94 is disposed inside the gas pressure chamber 911 of the valve main body 91 and magnifies the displacement of the piezoelectric element 93 to be acted on the valve disc 92.

The valve driving device 72 includes a charging drive circuit adapted to expand the piezoelectric element 93 by charging the piezoelectric element 93 with electric charges through the application of the drive voltage and a discharging drive circuit adapted to contract the piezoelectric element 93 by discharging the charged electric charges, and drives the valve disc 92 to open and close via expansion and contraction displacement of the piezoelectric element 93.

It should be noted that it is enough for the valve driving device 72 that both the drive circuits are electrically connected to the piezoelectric element, and the valve driving device 72 is not necessarily physically integrated with the valve main body 91.

The displacement magnifying mechanisms 94 are provided as a pair symmetrically with respect to a line (hereinafter referred to as a "center line") connecting a longitudinal axis of the piezoelectric element 93 and the gas exhaust path 912.

A first displacement magnifying mechanism includes a first hinge 96a, a second hinge 97a, a first arm member 98a, and a first flat spring 99a. The first hinge 96a is joined at one end to the valve main body 91. The second hinge 97a is joined at one end to a cap member 931 attached to the piezoelectric element 93. The first hinge 96a and the second hinge 97a are joined at the other ends to a base of the first arm member 98a. The first flat spring 99a is joined at one end to an outer tip end portion of the first arm member 98a. The first flat spring 99a is joined at the other end to a side end portion of the valve disc 92 on one side.

Meanwhile, a second displacement magnifying mechanism includes a third hinge 96b, a fourth hinge 97b, a second arm member 98b, and a second flat spring 99b. The third hinge 96b is joined at one end to the valve main body 91. The fourth hinge 97b is joined at one end to the cap member 931 attached to the piezoelectric element 93. The third hinge 96b and the fourth hinge 97b are joined at the other ends to a base of the second arm member 98b. The second flat spring 99b is joined at one end to an outer tip end portion of the second arm member 98b. The second flat spring 99b is joined at the other end to a side end portion of the valve disc 92 on the other side.

In the piezoelectric valve 9, in the state of FIG. 3, when the piezoelectric element 93 is energized by the valve driving device 72, the piezoelectric element 93 expands in the right direction in the drawing. In the first displacement magnifying mechanism, the displacement due to the expansion of the piezoelectric element 93 is magnified based on the principle of leverage, having the second hinge 97a as a point of effort, the first hinge 96a as a fulcrum, and the tip end portion of the first arm member 98a as a point of load, to thus significantly displace the outer tip end portion of the first arm member 98a. Likewise, in the second displacement magnifying mechanism, the displacement due to the expansion of the piezoelectric element 93 is magnified based on the principle of leverage, having the fourth hinge 97b as a point of effort, the third hinge 96b as a fulcrum, and the tip end portion of the second arm member 98b as a point of load, to thus significantly displace the outer tip end portion of the second arm member 98b.

Further, the displacement of the outer tip end portions of the first arm member 98a and the second arm member 98b separates the valve disc 92 from a valve seat 95 via the first flat spring 99a and the second flat spring 99b to thus open the gas exhaust path 912.

Meanwhile, in the piezoelectric valve 9, when the aforementioned energization of the piezoelectric element 93 by the valve driving device 72 is dismissed, the piezoelectric element 93 contracts and the contraction is transmitted to the valve disc 92 via the first and the second displacement magnifying mechanisms so that the valve disc 92 is seated on the valve seat 95.

It should be noted that the aforementioned piezoelectric valve 9 only needs to include the valve main body 91 including the gas pressure chamber 911 supplied with a compressed gas from a compressed gas supply source and the gas exhaust path 912 that ejects the gas inside the gas pressure chamber 911 to the outside, and the actuator including the valve disc 92 that is disposed inside the gas pressure chamber 911 of the valve main body 91 and that opens and closes the gas exhaust path 912, the piezoelectric element 93 that generates a drive force necessary for operating the valve disc 92 as displacement, and the displacement mechanism that is disposed inside the gas pressure chamber 911 and that causes the displacement of the piezoelectric element 93 to be acted on the valve disc 92, and is not limited to that shown in FIG. 3.

FIG. 4A and FIG. 4B are a diagram and a table for describing the drive voltage applied to the piezoelectric element; FIG. 4A is a waveform diagram of the drive voltage applied to the piezoelectric element; and FIG. 4B is a table for describing the relation between the drive voltage and an input signal into the charging drive circuit. Further, FIG. 5 is a graph for describing air ejection pressure characteristics of the piezoelectric valve.

Experiments were conducted on the basis of the method described in [Example] of Japanese Patent Laid-Open No. 2017-160973. The experimental conditions are as follows:
(1) Compressed air supply pressure: 0.12 MPa (gauge pressure value under atmospheric pressure)
(2) Drive voltage: 48 to 72 V
(3) Set flow rate of compressed air: 50 L/min
(4) Input signal: 1 ms
    First prepulse time t1, first quiescent time t2, second prepulse time t3, second quiescent time t4, and main pulse time t5 are set for each drive voltage (see FIG. 4B).
    (conduction time of piezoelectric element: 1 ms)
(5) Air ejection pressure detection position: 2 mm from leading end of gas exhaust path It should be noted that as shown in FIG. 4A and FIG. 4B, the time of the input signal at each of t1, t2, t4, and t5 slightly differs depending on the voltage value of the drive voltage, which resulted from consideration of stability of the air ejection pressure and the like.

From the results shown in FIG. 5, it can be recognized that in the piezoelectric valve 9, when the drive voltage applied to the piezoelectric element 93 is changed, the jet-air pressure of the compressed air changes. Further, it can be recognized that when the drive voltage applied to the piezoelectric element 93 is increased, the jet-air pressure of the compressed air increases. This seems to be caused by the opening degree of the piezoelectric valve changed by a change in the distance between the valve disc 92 and the valve seat 95 due to a change in the drive voltage applied to the piezoelectric element 93 in the piezoelectric valve 9.

In the optical sorter of Embodiment 1 of the present invention, the air-jetting device 7 includes the piezoelectric valve 9 adapted to perform valve opening and closing by driving the valve disc 92 utilizing the displacement of the piezoelectric element 93, and the valve driving device 72 adapted to apply the drive voltage to the piezoelectric element 93. Further, the valve driving device 72 controls the drive voltage applied to the piezoelectric element 93 in accordance with the particulates to be removed and adjusts the opening degree of the piezoelectric valve by driving the valve disc 92 using the expansion and contraction of the piezoelectric element 93, to thus control the jet-air pressure of the compressed air for removing the particulates.

In the optical sorter of Embodiment 1 of the present invention, the determination part of the controller 6 determines the type of the particulates to be removed and the valve driving device 72 controls the drive voltage applied to the piezoelectric element 93 in accordance with the type of the particulates to be removed, so that the jet-air pressure of the compressed air for removing the particulates can be controlled. Further, for the particulates having higher specific gravity defined by the type, a higher drive voltage is applied to the piezoelectric element 93 to thus increase the jet-air pressure of the compressed air, so that the particulates to be removed can be surely removed and sorted into two types.

Here, regarding the type of the particulates, in the case of grains, for example, damaged grains or glass can be detected using visible rays and pebbles or glass, as foreign matter, can be detected using near infrared rays.

Further, as for the drive voltage applied to the piezoelectric element 93, the voltage value can be set in advance based on the specific gravity for each type of particulates.

In the optical sorter of Embodiment 1 of the present invention, the determination part of the controller 6 determines the size of the particulates to be removed. The valve driving device 72 controls the drive voltage applied to the piezoelectric element 93 in accordance with the size of the particulates to be removed, so that the jet-air pressure of the compressed air for removing the particulates can be controlled. Further, since it is assumed that the particulates larger in size have a greater weight, for the particulates larger in size, a higher drive voltage is applied to the piezoelectric element 93 to thus increase the jet-air pressure of the compressed air, so that the particulates to be removed can be surely removed.

As for the drive voltage applied to the piezoelectric element 93, the voltage value is preferably set in advance in accordance with the size of the particulates.

In the optical sorter of Embodiment 1 of the present invention, the determination part of the controller 6 determines the type and the size of the particulates to be removed. The valve driving device 72 controls the drive voltage applied to the piezoelectric element 93 in accordance with the type and the size of the particulates to be removed, so that the jet-air pressure of the compressed air for removing the particulates can be controlled. Further, the weight is obtained by assumption from a combination of the specific gravity defined by the type of the particulates and the size of the particulates, and a higher drive voltage is applied to the piezoelectric element 93 for the particulates having a greater weight. The jet-air pressure of the compressed air is increased, so that the particulates to be removed can be surely removed.

As for the drive voltage applied to the piezoelectric element 93, the voltage value is preferably set in advance in accordance with the weight obtained from a combination of the type and the size of the particulates.

The optical sorter of Embodiment 1 of the present invention includes the piezoelectric valve 9 that is superior to the solenoid valve in responsiveness during valve opening and closing. Thus, the air-jetting time need not be set longer unlike the conventional optical sorters using the solenoid valve. In addition, the valve driving device 72 controls the drive voltage applied to the piezoelectric element 93 in accordance with the particulates to be removed and adjusts the opening degree of the piezoelectric valve 9 by driving the valve disc 92 using the expansion and contraction of the piezoelectric element 93, to thus control the jet-air pressure of the compressed air for removing the particulates. In this manner, the jet-air pressure of the compressed air can be changed, even when the compressed air supply pressure is constant.

Therefore, according to the optical sorter of Embodiment 1 of the present invention, since the air-jetting time can be fixed at a short period of time in which for example, the surrounding particulates do not get involved, and the jet-air pressure of the compressed air can be controlled in accordance with the particulates to be removed, the involvement of the other particulates is reduced to thus be able to surely remove the particulates to be removed.

Embodiment 2

The optical sorter of Embodiment 2 of the present invention divides the particulates to be removed into a plurality of groups and divides the particulates as raw material into at least three or more groups.

Figures 6, 7:
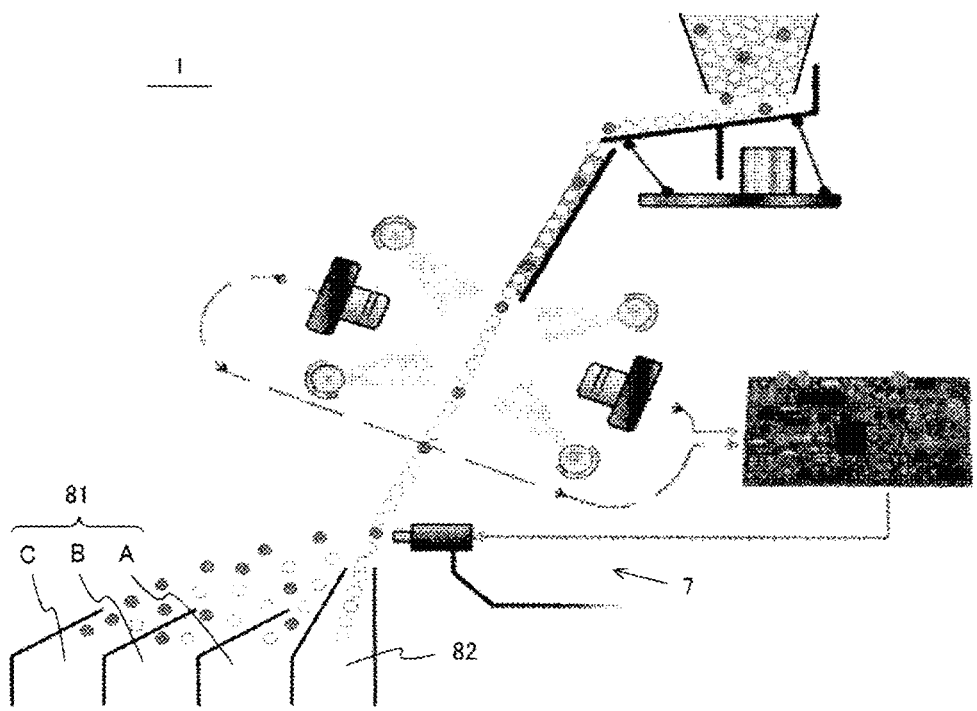
FIG. 6 is an explanatory view of the optical sorter of Embodiment 2.
FIG. 7 is a table showing the relation between a drive voltage applied to the piezoelectric element in accordance with the type of defectives and the like and a discharge port of the optical sorter of Embodiment 2.

FIG. 6 shows an explanatory view of the optical sorter of Embodiment 2 of the present invention.

The optical sorter 1 of Embodiment 2 of the present invention differs from the optical sorter of Embodiment 1 shown in FIG. 1 in that the optical sorter 1 of Embodiment 2 includes four particulates discharge ports and can divide the particulates to be removed into three types. It should be noted that since the other configurations are substantially the same as those of the optical sorter of Embodiment 1, the detailed description of the other configurations will be omitted here.

In the optical sorter of Embodiment 2 of the present invention, the valve driving device 72 controls the drive voltage applied to the piezoelectric element 93 in accordance with the particulates to be removed to thus control the jet-air pressure of the compressed air for removing the particulates so as to change the distance of blowing off using the jet air in accordance with the particulates, so that the involvement of the other particulates is reduced to thus be able to surely remove the particulates to be removed and the particulates to be removed can be divided into a plurality of groups in accordance with a difference in the distance of blowing off using the jet air.

FIG. 7 shows an example of the relation between the drive voltage set in accordance with the type of defectives and the like and the discharge port of the optical sorter of Embodiment 2.

In FIG. 7, the optical sorter of Embodiment 2 of the present invention is assumed to be set in the post-process of a rice husker, and brown rice, damaged grains, rice hulls, and foreign matter such as pebbles or glass are discharged from the rice husker. The mixing rate of the defectives and the like is assumed to be around 1 to 5% for damaged grains, around 10% for rice hulls, and 1% or less for foreign matter.

In the example of FIG. 7, the supplied air pressure for the piezoelectric valve 9 is constant at MPa, and different voltage values are set in advance corresponding to the respective particulates.

For example, in the case of foreign matter, the foreign matter has the greatest weight among particulates, and is thus discharged from "A" of the defectives discharge port 81 by setting the shortest distance of blowing off, and the drive voltage is set the lowest at 54 V or lower.

Further, in the case of rice hulls and damaged grains, since rice hulls have low specific gravity, but are large in size, and damaged grains have high specific gravity, but are small in size, rice hulls and damaged grains are substantially the same in weight. Here, rice hulls have a higher mixing rate as compared to damaged grains and are thus discharged from "B" of the defectives discharge port 81 by setting the middle distance of blowing off, and the drive voltage is set to be the same as foreign matter at 54 V or higher.

Furthermore, damaged grains are set to be blown off the farthest, and are discharged from "C" of the defectives discharge port 81, and the drive voltage is set the highest at 72 V.

In the optical sorter of Embodiment 2 of the present invention, the determination part of the controller 6 determines the type of the particulates to be removed and the valve driving device 72 controls the drive voltage applied to the piezoelectric element 93 in accordance with the type of the particulates to be removed, so that the jet-air pressure of the compressed air for removing the particulates can be controlled. Further, a lower drive voltage is applied to the piezoelectric element 93 such that the particulates having higher specific gravity defined by the type have a shorter distance of blowing off by the jet air to thus reduce the jet-air pressure of the compressed air, so that the particulates to be removed can be divided into a plurality of groups in accordance with the type.

In the optical sorter of Embodiment 2 of the present invention, when a lower drive voltage is applied to the piezoelectric element 93 such that the particulates having higher specific gravity defined by the type have a shorter distance of blowing off by the jet air to thus reduce the jet-air pressure of the compressed air, the particulates having higher specific gravity can be prevented from falling in the halfway to be mixed into the particulates of other types.

In the optical sorter of Embodiment 2 of the present invention, in the case where the particulates to be removed are of the types in which the specific gravities are almost the same, the valve driving device 72 can control the drive voltage applied to the piezoelectric element 93 based on the mixing rate for each type of the particulates to be removed. Further, a lower drive voltage is applied to the piezoelectric element 93 such that the particulates having a higher mixing rate have a shorter distance of blowing off by the jet air to thus reduce the jet-air pressure of the compressed air, so that the particulates to be removed can be divided into a plurality of groups by type.

In the optical sorter of Embodiment 2 of the present invention, in the case where the particulates are of the types in which the specific gravities are almost the same, when a lower drive voltage is applied to the piezoelectric element 93 such that the particulates having a higher mixing rate have a shorter distance of blowing off by the jet air to thus reduce the jet-air pressure of the compressed air, the particulates having a higher mixing rate can be prevented from falling in the halfway to be mixed into the particulates of other types.

In the optical sorter of Embodiment 2 of the present invention, the determination part of the controller 6 determines the size of the particulates to be removed and the valve driving device 72 controls the drive voltage applied to the piezoelectric element 93 in accordance with the size of the particulates to be removed, so that the jet-air pressure of the compressed air for removing the particulates can be controlled. Further, since it is assumed that the particulates larger in size have a greater weight, for the particulates lager in size, a lower drive voltage is applied to the piezoelectric element 93 so as to reduce the distance of blowing off by the jet air to thus reduce the jet-air pressure of the compressed air, so that the particulates to be removed can be divided into a plurality of groups by size.

In the optical sorter of Embodiment 2 of the present invention, when a lower drive voltage is applied to the piezoelectric element 93 such that the particulates larger in size have a shorter distance of blowing off by the jet air to thus reduce the jet-air pressure of the compressed air, the particulates larger in size can be prevented from falling in the halfway to be mixed into the particulates of other sizes.

In the optical sorter of Embodiment 2 of the present invention, the determination part of the controller 6 determines the type and the size of the particulates to be removed and the valve driving device 72 controls the drive voltage applied to the piezoelectric element 93 in accordance with the type and the size of the particulates to be removed, so that the jet-air pressure of the compressed air for removing the particulates can be controlled. Further, the weight is obtained (assumed) from a combination of the specific gravity defined by the type of the particulates and the size of the particulates, and a lower drive voltage is applied to the piezoelectric element 93 such that the particulates having a greater weight have a shorter distance of blowing off by the jet air to thus reduce the jet-air pressure of the compressed air, so that the particulates to be removed can be divided into a plurality of groups in accordance with a combination of the type and the size.

In the optical sorter of Embodiment 2 of the present invention, when the weight is obtained from a combination of the specific gravity defined by the type of the particulates and the size of the particulates and a lower drive voltage is applied to the piezoelectric element 93 such that the particulates having a greater weight have a shorter distance of blowing off by the jet air to thus reduce the jet-air pressure of the compressed air, the particulates having a greater weight can be prevented from falling in the halfway to be mixed into the particulates of other sizes.

Further, in the optical sorter of Embodiment 2 of the present invention, in the case where the particulates to be removed have almost the same weight, the valve driving device 72 can control the drive voltage applied to the piezoelectric element 93 based on the mixing rate for each type of the particulates to be removed. Further, a lower drive voltage is applied to the piezoelectric element 93 such that the particulates having a higher mixing rate have a shorter distance of blowing off by the jet air to thus reduce the jet-air pressure of the compressed air, so that the particulates to be removed can be divided into a plurality of groups in accordance with a combination of the type and the size.

In the optical sorter of Embodiment 2 of the present invention, in the case where the particulates have almost the same weight, when a lower drive voltage is applied to the piezoelectric element 93 such that the particulates having a higher mixing rate have a shorter distance of blowing off by the jet air to thus reduce the jet-air pressure of the compressed air, the particulates having a higher mixing rate can be prevented from falling in the halfway to be mixed into the particulates in other groups.

It should be noted that in the optical sorter of Embodiment 2 of the present invention, the distance of blowing off the particulates to be removed by the jet air is not limited to the aforementioned examples, and may be set in any way, for example, by blowing off the particulates having higher specific gravity the farthest.

According to the optical sorter of Embodiment 2 of the present invention, the particulates to be removed can be divided into a plurality of groups using one air-jetting nozzle 71.

It goes without saying that the present invention is not limited to the aforementioned embodiments and the configuration can be appropriately changed without departing the scope of the invention.

INDUSTRIAL APPLICABILITY

The optical sorter of the present invention reduces the involvement to thus be able to surely remove the to-be-sorted material to be removed and is very useful.

REFERENCE SIGNS LIST 1 optical sorter
2 tank
3 vibrating feeder
4 inclined chute
5a, 5b optical detector
51a, 51b CCD camera (imaging unit)
52a, 52b illuminating unit
53a, 53b background
6 controller
7 air-jetting device
71 air-jetting nozzle
72 valve driving device
73 compressed air supplier
81 defectives discharge port
82 non-defectives discharge port
9 piezoelectric valve
91 valve main body
911 gas pressure chamber
912 gas exhaust path
92 valve disc
93 piezoelectric element
94 displacement magnifying mechanism
95 valve seat
98a, 98b arm member
99a, 99b flat spring

The invention claimed is:

1. An optical sorter comprising:
a camera adapted to detect a to-be-sorted material at a detection position;
a controller adapted to determine a to-be-sorted material to be removed, based on a detection result by the camera; and
an air-jetting unit adapted to blow off and remove the to-be-sorted material to be removed using jet air of a compressed gas, based on a determination result by the controller, wherein
the air-jetting unit includes:
a piezoelectric valve adapted to perform valve opening and closing by driving a valve disc utilizing displacement of a piezoelectric element; and
a valve driving unit adapted to apply a drive voltage to the piezoelectric element,
the valve driving unit controls the drive voltage applied to the piezoelectric element in accordance with the to-be-sorted material to be removed by the controller to thus control a jet-air pressure of the compressed gas for removing the to-be-sorted material, and
a value of the drive voltage applied to the piezoelectric element changes in accordance with the to-be-sorted material to be removed.

2. The optical sorter according to claim 1, wherein
the valve driving unit controls the drive voltage applied to the piezoelectric element in accordance with the to-be-sorted material to be removed to thus control the jet-air pressure of the compressed gas for removing the to-be-sorted material so as to change a distance of blowing off using the jet air in accordance with the to-be-sorted material, so that the to-be-sorted material to be removed is divided into a plurality of groups in accordance with a difference in the distance of blowing off using the jet air.

3. The optical sorter according to claim 1, wherein
the controller determines a type of the to-be-sorted material to be removed,
the valve driving unit controls the drive voltage applied to the piezoelectric element in accordance with the type of the to-be-sorted material to be removed to thus control the jet-air pressure of the compressed gas for removing the to-be-sorted material, and
the value of the drive voltage applied to the piezoelectric element is preset based on a specific gravity for each to-be-sorted material to be removed.

4. The optical sorter according to claim 1, wherein
the controller determines a size of the to-be-sorted material to be removed,
the valve driving unit controls the drive voltage applied to the piezoelectric element in accordance with the size of the to-be-sorted material to be removed to thus control the jet-air pressure of the compressed gas for removing the to-be-sorted material, and
the value of the drive voltage applied to the piezoelectric element is preset based on the size of each to-be-sorted material to be removed.

5. The optical sorter according to claim 1, wherein
the controller determines a type and a size of the to-be-sorted material to be removed,
the valve driving unit controls the drive voltage applied to the piezoelectric element in accordance with the type and the size of the to-be-sorted material to be removed to thus control the jet-air pressure of the compressed gas for removing the to-be-sorted material, and
the value of the drive voltage applied to the piezoelectric element is preset based on a weight obtained from a combination of the type and the size of the to-be-sorted material to be removed.

6. The optical sorter according to claim 1, wherein the piezoelectric valve comprises:
a valve main body including:
a gas pressure chamber adapted to receive a compressed gas supplied from an outside source; and
a gas exhaust path adapted to exhaust the compressed gas from the gas pressure chamber; and
an actuator including:
the valve disc disposed in the gas pressure chamber and adapted to open and close the gas exhaust path;
the piezoelectric element adapted to generate a drive force necessary for operating the valve disc as displacement; and
a displacement mechanism adapted to cause the displacement of the piezoelectric element to be acted on the valve disc, and
the valve driving unit controls the drive voltage applied to the piezoelectric element in accordance with the to-be-sorted material to be removed to thus control the jet-air pressure of the compressed gas for removing the to-be-sorted material, by driving the valve disc using expansion and contraction of the piezoelectric element.

* * * * *